US010644555B2

(12) United States Patent
Mueller et al.

(10) Patent No.: US 10,644,555 B2
(45) Date of Patent: May 5, 2020

(54) WINDING SUPPORT

(71) Applicant: Robert Bosch GmbH, Stuttgart (DE)

(72) Inventors: Tankred Mueller, Baden-Baden (DE); Victor Ludwig, Oberhamersbach (DE)

(73) Assignee: Robert Bosch GmbH, Stuttgart (DE)

( * ) Notice: Subject to any disclaimer, the term of this patent is extended or adjusted under 35 U.S.C. 154(b) by 253 days.

(21) Appl. No.: 15/632,563

(22) Filed: Jun. 26, 2017

(65) Prior Publication Data

US 2018/0006515 A1 Jan. 4, 2018

(30) Foreign Application Priority Data

Jun. 30, 2016 (DE) .................. 10 2016 211 833

(51) Int. Cl.
| | | |
|---|---|---|
| *H02K 3/12* | (2006.01) | |
| *H02K 3/28* | (2006.01) | |
| *H02K 3/24* | (2006.01) | |
| *H02K 3/50* | (2006.01) | |
| *H02K 3/52* | (2006.01) | |

(52) U.S. Cl.
CPC ................. *H02K 3/12* (2013.01); *H02K 3/24* (2013.01); *H02K 3/28* (2013.01); *H02K 3/50* (2013.01); *H02K 3/528* (2013.01)

(58) Field of Classification Search
CPC .. H02K 3/12; H02K 3/24; H02K 3/50; H02K 3/528; H02K 23/30; H02K 21/22; Y10T 29/49012
See application file for complete search history.

(56) References Cited

U.S. PATENT DOCUMENTS

| | | | | | |
|---|---|---|---|---|---|
| 6,194,805 | B1* | 2/2001 | Heese | ................... | H02K 19/06 310/166 |
| 6,225,722 | B1* | 5/2001 | Rupp | ..................... | H02K 21/22 310/91 |
| 7,560,848 | B2* | 7/2009 | Roos | ...................... | H02K 23/30 310/233 |
| 8,698,370 | B2* | 4/2014 | Roos | ...................... | H02K 23/38 310/177 |
| 2003/0048022 | A1* | 3/2003 | Nagai | ...................... | H02K 3/51 310/215 |
| 2003/0127933 | A1* | 7/2003 | Enomoto | ............. | C07D 493/04 310/194 |
| 2007/0252447 | A1* | 11/2007 | Ionel | ...................... | H02K 1/148 310/44 |
| 2007/0257572 | A1* | 11/2007 | Nakano | ..................... | H02K 1/24 310/68 D |

(Continued)

FOREIGN PATENT DOCUMENTS

DE 102004018208 11/2005

*Primary Examiner* — Michael E Gallion
(74) *Attorney, Agent, or Firm* — Michael Best & Friedrich LLP

(57) ABSTRACT

A winding support (1) for an electric machine (100), having multiple pole teeth (10), wherein each pole tooth (10) has a tooth shank (14) around which at least one winding can be arranged, and wherein a tooth shank (14) has an increasing width of the tooth shank (14) in an axial direction (3) of the winding support (1) proceeding from an axial face side of the winding support (1). At least one tooth shank (14) has an increasing or decreasing width in or counter to the radial direction (5) of the winding support (1).

16 Claims, 4 Drawing Sheets

(56) References Cited

U.S. PATENT DOCUMENTS

| | | | | |
|---|---|---|---|---|
| 2009/0058213 | A1* | 3/2009 | Sugishima | H02K 23/36 |
| | | | | 310/198 |
| 2009/0309451 | A1* | 12/2009 | Roos | H02K 23/30 |
| | | | | 310/179 |
| 2011/0285243 | A1* | 11/2011 | Taniguchi | H02K 21/16 |
| | | | | 310/216.074 |
| 2015/0247530 | A1* | 9/2015 | Lang | F16C 32/0474 |
| | | | | 310/90.5 |
| 2019/0372408 | A1* | 12/2019 | Taniguchi | H02K 1/165 |
| 2019/0379252 | A1* | 12/2019 | Taniguchi | H02K 3/42 |

* cited by examiner

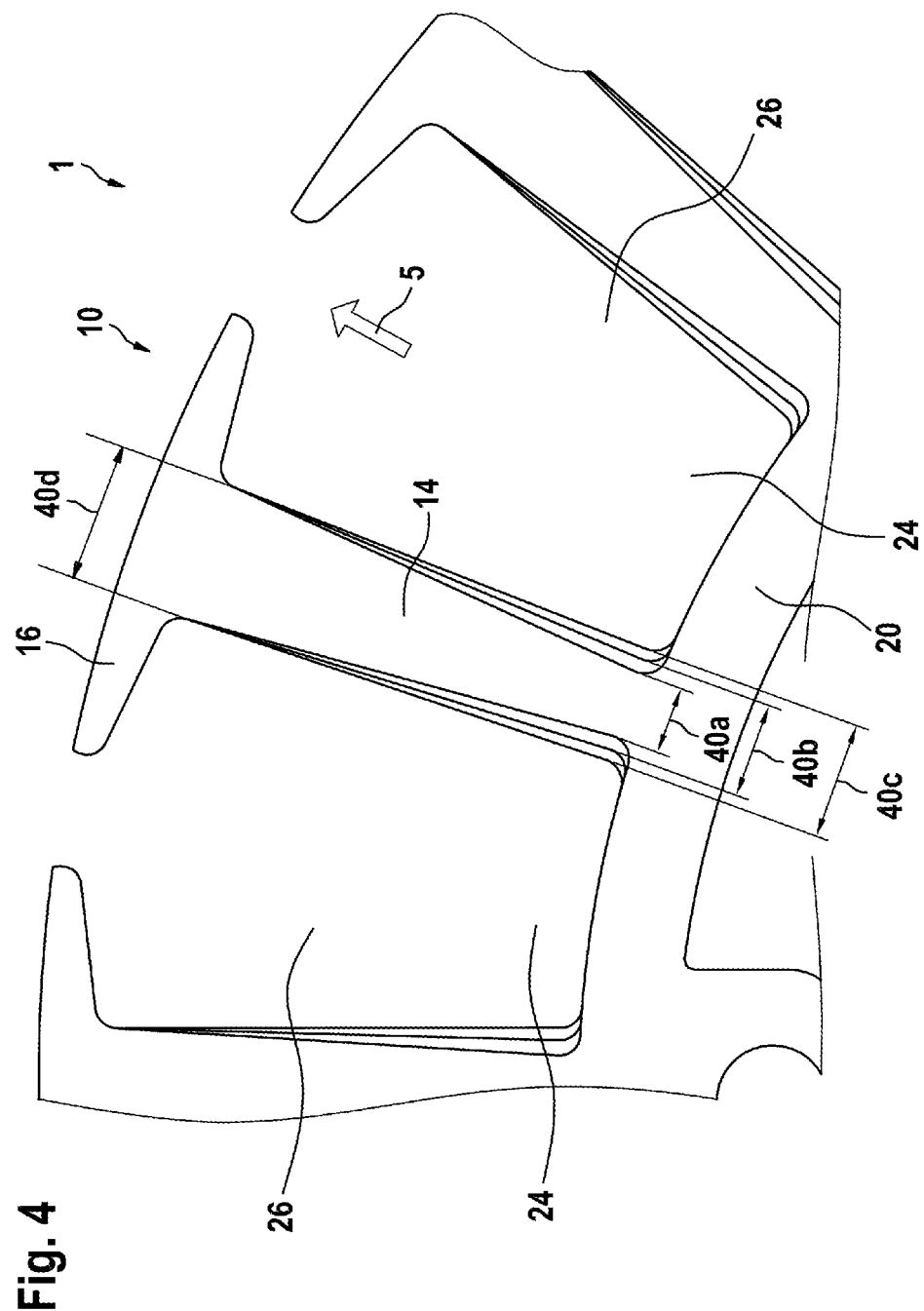

WINDING SUPPORT

BACKGROUND OF THE INVENTION

The present invention relates to a winding support for an electric machine, to a stator having a winding support, and to an electric machine having a winding support.

DE 10 2004 018 208 A1 has disclosed a winding support for an electric machine with multiple pole teeth. Each pole tooth has a tooth shank around which at least one winding can be arranged. The tooth shanks have an increasing width of the tooth shank in an axial direction of the winding support proceeding from the axial face sides of the winding support.

SUMMARY OF THE INVENTION

An embodiment according to the invention of the winding support has the advantage that the winding wire can be arranged around the tooth shank more effectively, and in particular, the winding wire fill factor is increased. An improved arrangement of the winding wire, or an increase in the number of windings, leads in particular to an increase of power without the need to modify the outer dimensions of the winding support.

It is advantageous for at least one tooth shank to have an increasing width axially toward the center of the tooth shank proceeding from the axial face sides of the winding support. Uniform winding-on of the winding wire is achieved.

It is particularly advantageous for the winding support to have a base element. The base element connects the tooth shanks. The base element has a circumferential region which is in particular of circular form. The pole teeth are arranged on the circumferential region of the base element so as to project in the radial direction. The longitudinal axis of the pole teeth extends in or counter to the radial direction of the winding support. The result is a winding support with a multiplicity of pole teeth which are oriented radially.

It is considered to be advantageous for the winding support to be assembled from individual elements. The individual elements have in each case one pole tooth. When assembled, said elements form the winding support. The pole teeth of the elements may be prepared, in particular enwound with at least one winding, in advance. After the enwinding process, the elements are assembled to form a winding support. The enwinding of the pole teeth is simplified.

It is advantageous for the width of at least one tooth shank to increase or decrease in the radial direction of the winding support proceeding from the base element. The width of a tooth shank corresponds to the dimensions of the tooth shank in the circumferential direction of the winding support. In relation to known pole teeth, an improvement in the conduction of the magnetic flux through the tooth shank, and improvement in winding capability, are achieved.

It is advantageous for the winding support to be embodied as a laminated core. The laminated core is assembled from multiple sheet-metal laminations. The sheet-metal laminations are arranged in an axial direction of the winding support. A reduction of the eddy currents in the laminations, and thus an improvement in the efficiency of the machine, are achieved.

It is considered to be advantageous for individual sheet-metal laminations to have, in the region of at least one tooth shank, an increasing or decreasing width in or counter to the radial direction of the winding support. By means of the different form of individual sheet-metal laminations in the region of the tooth shank, it is possible for the tooth shank according to the invention to be implemented easily and in uncomplicated fashion.

It is advantageous for individual sheet-metal laminations of a tooth shank to have an increasing width proceeding from the axial face sides of the winding support. It is thus possible for the increasing width of the tooth shank proceeding from the face sides of the winding support to be implemented easily. The width of those regions of the laminations which, together with the other laminations, form the tooth shank can be easily varied between the individual laminations. When the sheet-metal laminations are assembled in accordance with their width in the region of the tooth shank, the result is a winding support according to the invention.

It is particularly advantageous for individual sheet-metal laminations of the laminated core to be of similar, in particular identical, form. A corresponding design has the result that the number of different tools for producing the laminated core is reduced. It is advantageous that the costs for the production process are lowered.

It is advantageous for the pole teeth to have pole heads which have a greater width than the tooth shanks at their widest point. The windings are prevented from slipping off the pole teeth. Furthermore, the process of winding the windings is simplified. It is also to be considered advantageous that the magnetic flux can be conducted through the pole teeth more effectively.

It is advantageous for the width of at least one tooth shank to increase in or counter to the radial direction of the winding support proceeding from a tooth head. In this way, the winding has an increased number of winding wires in the region of the tooth head or of the base element, whereby the magnetic flux that is generated can be influenced.

It is advantageous for a stator or rotor to be implemented with a winding support according to the invention, because such a stator can be produced more easily and has a higher level of power and/or greater efficiency.

What is particularly advantageous is an electric machine, in particular a fan drive or a pump for a motor vehicle, having a winding support according to the invention, because such a machine can be produced more easily and has a higher level of power and/or greater efficiency.

BRIEF DESCRIPTION OF THE DRAWINGS

Further features of the invention will emerge from the figures and are discussed in more detail in the following description. In the figures:

FIG. 4 shows a detail of a further exemplary embodiment of a winding support.

DETAILED DESCRIPTION

Figure 1:
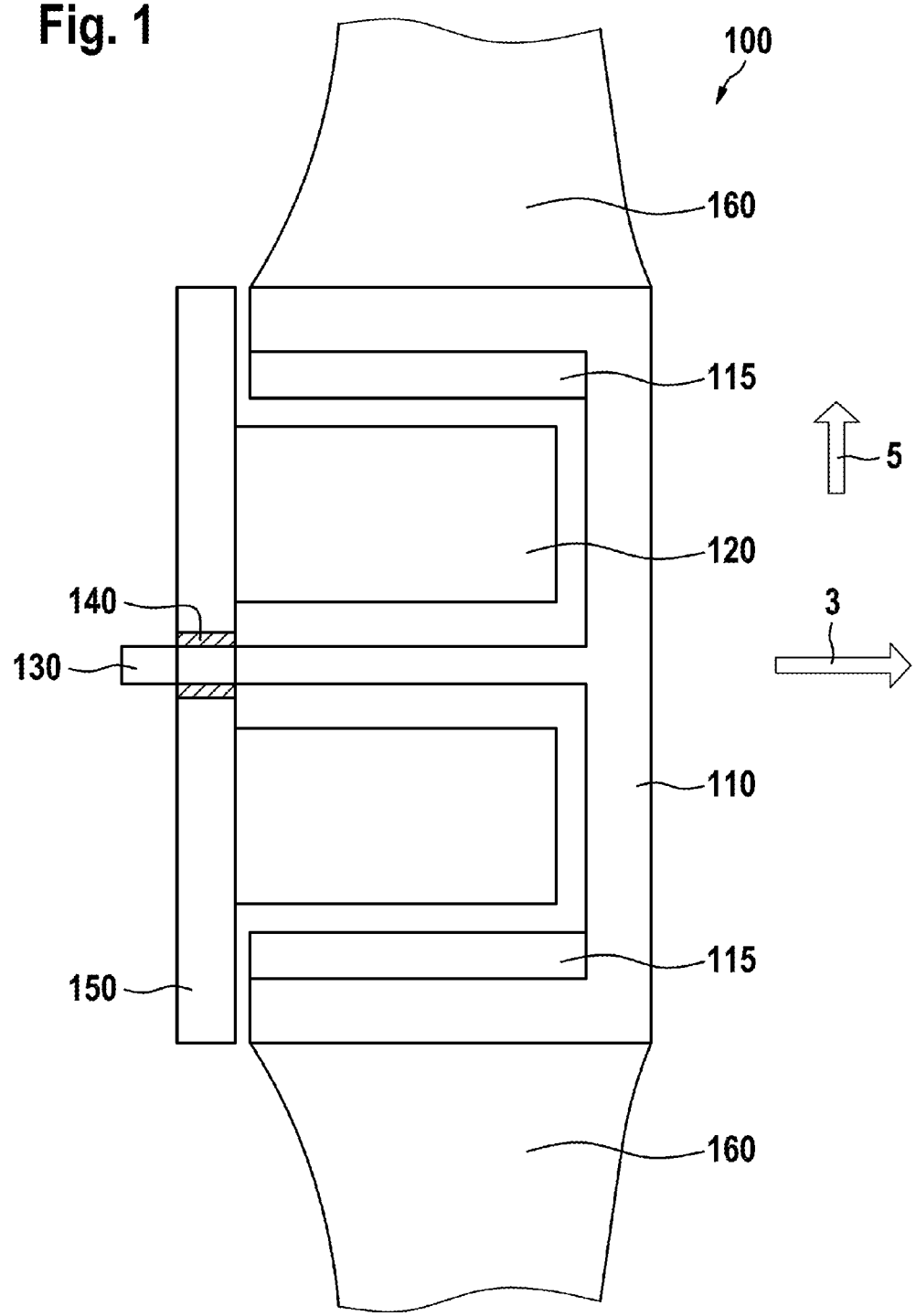
FIG. 1 shows a longitudinal section through an electric machine.

FIG. 1 illustrates an electric machine 100 in simplified form in a longitudinal section. The electric machine 100 is embodied, by way of example, as an external-rotor motor. The electric machine 100 may be used in a motor vehicle, for example in a window regulator, a seat motor, a fan motor, a pump motor or the like. The electric machine 100 has a rotor 110 and a stator 120. The rotor 110 is arranged so as to be rotatable relative to the stator 120. The rotor 110 surrounds the stator 120. The rotor 110 has a spindle or shaft 130. The spindle or shaft 130 forms the longitudinal axis 3 of the electric machine 100. The longitudinal axis 3 runs parallel to the axial direction 3 of the electric machine 100. The rotor 110 rotates about the longitudinal axis or about the spindle 130.

The stator 120 is fixedly connected to a housing component 150. The housing component 150 has at least one recess in which a bearing 140 is arranged. The shaft or spindle 130 is mounted in the bearing 140. The bearing 140 is implemented in particular as a plain bearing or ball bearing. The axial direction 3 of the electric machine 100 and the radial direction 5 of the electric machine 100 are perpendicular to one another.

Fan blades 160 are arranged on the rotor 110 in the radial direction 5. The fan blades 160 are illustrated merely by way of example in FIG. 1. In the event of a rotation of the rotor 110, and thus a rotation of the fan blades 160, about the longitudinal axis 3, an air flow is generated in or counter to the axial direction 3, or in or counter to the radial direction 5. The radial direction 5 runs perpendicular to the longitudinal axis 3 of the electric machine 100.

Furthermore, the rotor 110 has magnetic elements 115, in particular magnets, or elements which interact with a magnetic field. The elements are fixedly connected to the rotor 110. Said elements interact with a magnetic field which is generated by means of a feed of current to the windings of the stator. In a refinement of the invention, the elements may likewise be formed as, or have, windings.

The electric machine 100 may alternatively also be embodied as an internal-rotor motor. In the case of an internal-rotor motor, the rotor 110 is arranged within the stator 120. The rotor 110 is arranged within the stator 120 in a radial direction.

Regardless of whether the electric machine 100 is embodied as an internal-rotor motor or as an external-rotor motor, a winding support 1 according to the invention may be part of the stator 120 or of the rotor 110. In particular, the stator 120 has the winding support 1 according to the invention. The winding support 1 may however also be part of the rotor 110. The stator 120 would then have the magnetic elements. It is also possible for the stator 120 and the rotor 110 to have a winding support 1 according to the invention.

Figure 2:
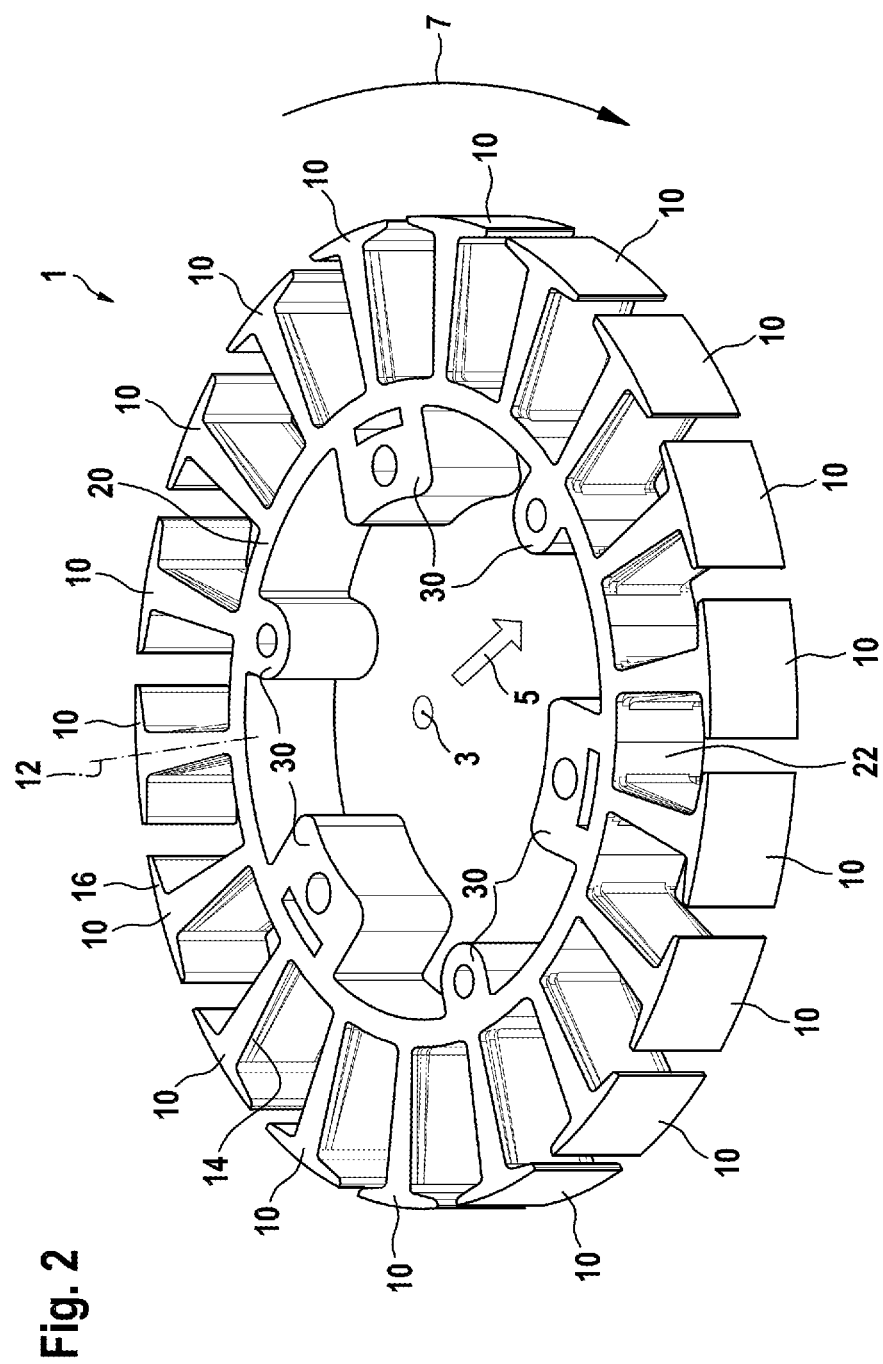
FIG. 2 shows a perspective view of a winding support according to the invention.

FIG. 2 shows a perspective view of a winding support 1 according to the invention. The winding support 1 has multiple, in particular a multiplicity of, preferably 18, pole teeth 10. Furthermore, the winding support 1 has a base element 20. The base element 20 has a circular ring. In a refinement, the base element 20 may also be of circular, elliptical, polygonal or square form. The base element 20 has a circumferential region 22 running in substantially circular fashion. The pole teeth 10 are arranged on the circumferential region 22 of the base element 20. In FIG. 2, the pole teeth 10 are arranged in radially projecting fashion on the base element 20 of the winding support 1. The pole teeth 10 extend in the radial direction 5 of the winding support 1.

In a refinement of the invention, the pole teeth 10 may also extend counter to the radial direction 5, in particular inward. Here, the base element 20 surrounds the pole teeth 10. Such an embodiment is encountered in particular in the case of an internal-rotor motor. In the case of the latter, the rotor is situated within the stator and thus within the winding support 1. The rotor is surrounded by the winding support 1. It is also possible for such an embodiment to be used if the winding support 1 is part of a rotor, wherein the electric machine is embodied as an external-rotor motor.

It is preferable for the radial direction 5 and the axial direction 3 of the winding support 1 to coincide with the radial direction 5 and the axial direction 3 of the electric machine 100. In particular, the longitudinal axis 12 of the pole teeth 10 runs along the radial direction 5 of the winding support 1. The pole teeth 10 are arranged so as to be spaced apart uniformly from one another in the circumferential direction.

In one embodiment, the pole teeth 10 point outward along or counter to the radial direction 5. Alternatively, the pole teeth 10 may also point inward along or counter to the radial direction 5.

The pole teeth 10 have a tooth shank 14 and a tooth head 16. The tooth shank 14 connects the tooth head 16 to the base element 20. The longitudinal axis 12 of the pole teeth 10 extends from the base element 20 via the tooth shank 14 to the tooth head 16.

The tooth shank 14 is designed such that at least one winding can be arranged thereon. In particular, at least one in particular insulated winding wire is wound around the tooth shank 14, which winding wire forms one or more windings. When fed with current, the winding generates a magnetic flux which is conducted from the tooth shank 14 to the tooth head 16 and/or to the base element 20. In a refinement of the invention, the base element 20 is designed so as to conduct the magnetic flux from one pole tooth 10 to a further, in particular adjacent pole tooth 10. The winding support 1 has a first axial face side and a second axial face side. Only one of the two face sides can be seen in FIG. 2. The axial face sides correspond in each case to the face sides of the winding support 1, which are visible from the axial direction 5 of the winding support 1 or of the electric machine 100.

At least one tooth shank 14 of the winding support 1 has an increasing width 40 of the tooth shank 14 proceeding from an axial face side of the winding support 1. The width 40 of the tooth shank 14 corresponds to the extent of the tooth shank 14 in the circumferential direction of the winding support 1. The circumferential direction 7 of the winding support 1 corresponds to the direction of rotation and/or the opposite direction of rotation of the electric machine 100.

At least one tooth shank 14 preferably has an increasing width in particular axially toward the center of the tooth shank 14 proceeding from the axial face sides of the winding support 1. Here, the increasing width of the tooth shank 14 need not imperatively extend over the entire length of the tooth shank 14. For example, the increasing width may extend over half of the length of the tooth shank, or over one third. It is preferably also possible for at least one tooth shank 14 to have an increasing width only in a subregion of the tooth shank 14 proceeding from one or both axial face sides of the winding support 1. In particular, the tooth shank 14 is of barrel-shaped form as viewed in cross section. In cross section, the tooth shank 14 has rounded portions instead of corners at its face sides. The roundings permit easier guidance of the winding wire. It is furthermore advantageous for the rounded portions to result in improved abutment of the winding wire against the winding support 1. The spacing between winding wire and winding support 1, in particular tooth shank 14, is reduced. An increase of the copper fill factor is achieved in this way. Furthermore, the rounded portions prevent damage to the winding wire resulting in particular from sharp edges on the winding support 1.

In a refinement of the invention, the tooth shanks 14 are at least partially surrounded by an insulating mask. The insulating mask is of extremely thin-walled design. The insulating mask prevents damage to the winding wire resulting in particular from sharp edges on the winding support 1.

Furthermore, the pole teeth 10 have an increasing or decreasing width over the length of the tooth shank 14 or in the radial direction 5 of the winding support 1. The width of the at least one tooth shank 14 increases or decreases in the radial direction 5 of the winding support 1. The tooth shank is preferably of conical and barrel-shaped form. For example, the width of the tooth shank 14 of the winding support 1 in FIG. 2 increases in the radial direction 5.

It is preferably also possible for at least one tooth shank 14 to have an increasing or decreasing width in or counter to the radial direction 5 only over a part of its length. By means of a design of the tooth shank 14 according to the invention, a reduction of the bulging of the winding wire is advantageously possible. The windings can thus be wound around the pole shanks 14 in a more effectively abutting and space-saving manner. This yields, in particular, space for additional windings.

The maximum width of the tooth shank 14 of the pole teeth 10 is smaller than the maximum width of the tooth head 16. Owing to the increased width of the tooth head 16 in relation to the tooth shank 14, the windings are prevented from slipping off in the radial direction 5. Also, the magnetic flux guidance is improved by means of the tooth head 16.

Furthermore, the winding support 1 has connecting means 30. The connecting means 30 have, in particular, circular or polygonal recesses which permit a connection of the winding support to a housing or to further components of an electric machine 100. The connecting means 30 may also be designed so as to permit an arrangement of a spindle or shaft, in particular a connection of the winding support 1 to a shaft or spindle. For this purpose, the winding support 1 has, in particular, a connecting means 30 which makes it possible to provide a recess for receiving a shaft or spindle.

Figure 3:
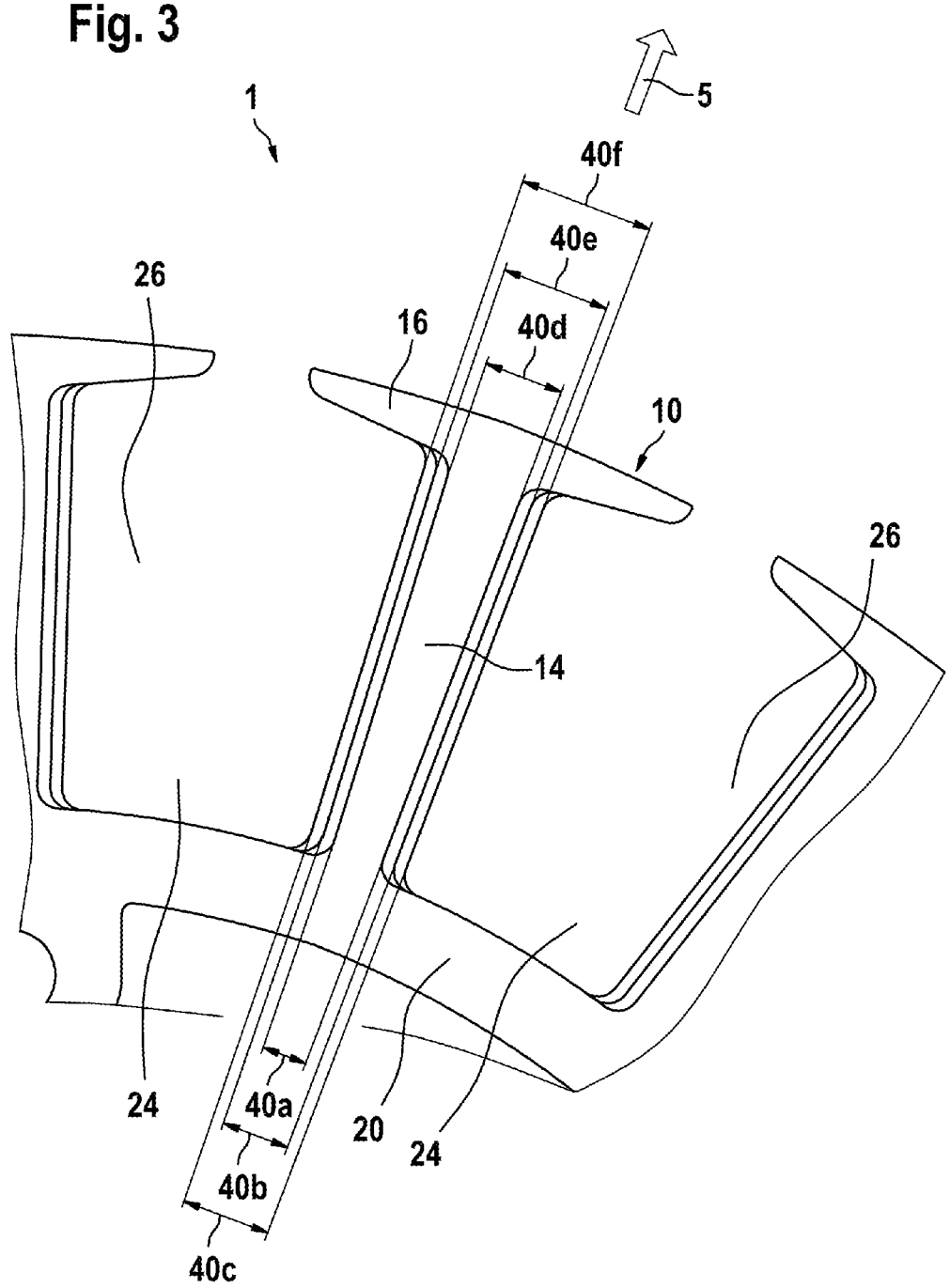
FIG. 3 shows a detail of an exemplary embodiment of a winding support.

FIG. 3 shows a detail of an exemplary embodiment of a winding support 1. The pole tooth 10 has a tooth shank 14 and a tooth head 16. The tooth shank 14 has an increasing width 40 proceeding from an axial face side of the winding support 1. In particular, the width of the tooth shank 14 increases in or counter to the axial direction 5 of the winding support. The width 40a is smaller than the width 40b, which is smaller than the width 40c. The widths 40a to 40c correspond to the width of the tooth shank 14 in the axial direction 3 of the winding support proceeding from the face side of the winding support.

Furthermore, the tooth shank 14 has an increasing or decreasing width in or counter to the radial direction 5 over the entire length of the tooth shank 14. For example, the tooth shank 14 has a width 40a at the transition to the base element, whereas the tooth shank 14 has a width 40d at the transition to the tooth head 16. Here, the width 40a is smaller than the width 40d. This profile is continued in the case of the further illustrated width specifications 40b and 40e and also 40c and 40f.

The width of the pole shank 14 increases proceeding from the base element 20. This yields more space in the region of the groove base 24 in relation to an embodiment with a constant width. A groove 26 is formed between the pole teeth 10. In the enwound state, the winding wires run in the groove 26. The groove base 24 is that part of the groove 26 which is directed toward the base element 20.

In particular, in the region of the groove base 24, the bulge is reduced, and thus the fill factor of winding wires is increased. Furthermore, it is advantageous in the case of such an embodiment that improved heat dissipation from the windings is possible owing to a reduced air gap between the tooth shank 14 and the winding wire.

FIG. 4 shows a detail of an exemplary embodiment of a winding support 1. The pole tooth 10 has a tooth head 16 and a tooth shank 14. By contrast to the exemplary embodiment in FIG. 3, the tooth shank 14 has an increasing width, in particular in or counter to the axial direction, over not its entire length but in particular over a part of the length proceeding from an axial face side of the winding support 1. The tooth shank 14 has an increasing width of the tooth shank 14 over the length of the tooth shank 14 or in the radial direction 5 of the winding support 1. At one end, in particular at the end that constitutes the transition to the tooth head 16, the tooth shank 14 does not have an increasing or decreasing width in the axial direction 3 of the winding support 1. The tooth shank 14 however has an increasing or decreasing width in the axial direction of the winding support 1 at the opposite end, in particular at that end which is directed toward the base element 20. The tooth shank 14 has a width 40d in the region of the tooth head 16. The tooth shank 14 has a width 40a, 40b and 40c in the region of the base element 20. The width 40a, 40b and 40c is smaller than the width 40d. The tooth shank 14 has an increase in width in the axial direction 5 over its entire length.

The length of the tooth shank 14 corresponds to the extent of the tooth shank in or counter to the radial direction 5 of the winding support 1. The width of the tooth shank 14 corresponds to its extent in or counter to the circumferential direction 7 of the winding support 1. The height of the tooth shank corresponds to the extent of the tooth shank in or counter to the axial direction 3 of the winding support 1. The longitudinal axis 12 runs parallel to the radial direction 5 of the tooth shank 12.

In a refinement of the invention, the height of at least one tooth shank 14, in particular of all tooth shanks 14, is uniform over the entire length thereof at least in one region, in particular along an imaginary line. The width of said line may in this case be very small. In particular, the tooth shank 14 is formed with a uniform height over its entire length in or counter to the radial direction 5 of the winding support 1. The height of the tooth shank 14 in or counter to the radial direction 5 is constant.

In a refinement of the invention, the winding support 1 is embodied as a laminated core. The laminated core is assembled from multiple sheet-metal laminations which are stacked together axially. The sheet-metal laminations are stacked in the axial direction 3 of the winding support 1. The sheet-metal laminations are in particular electrically insulated with respect to one another. The insulation is formed by insulation elements which are arranged between the individual sheet-metal laminations. The individual sheet-metal laminations are produced in particular by means of a punching process, and are arranged axially relative to one another in a further method step. By means of the axial arrangement, the individual sheet-metal laminations are connected to form a laminated core. In particular, the connection of the sheet-metal laminations may also be realized by means of the windings. Furthermore, the individual sheet-metal laminations may be connected to one another by means of an adhesive connection.

Correspondingly to FIG. 2, the sheet-metal laminations are of identical form in the region of the base element 20 and of the tooth head 16. The individual sheet-metal laminations differ only in the region of the tooth shank 14. The sheet-metal laminations have varying widths in the region that forms a tooth shank 14. The sheet-metal lamination has a greater or lesser width in a manner dependent on the position in the axial direction. For example, in FIG. 3, at least one sheet-metal lamination has a width from 40a to 40d. The width of the sheet-metal lamination increases in the radial direction 5 from a width 40a to a width 40d. A further sheet-metal lamination has a width of 40b and 40e. The width of the sheet-metal lamination increases in the radial direction 5 from a width 40b to a width 40e. A further sheet-metal lamination has a width of 40c and 40f. The width of the sheet-metal lamination increases in the radial direction 5 from a width 40c to a width 40f. In FIG. 4, by way of example, at least one sheet-metal lamination has a width from 40a to 40d. A further sheet-metal lamination has a width of 40b and 40d. A further sheet-metal lamination has a width of 40c and 40d. By means of such a form of the sheet-metal laminations, easy and inexpensive realization of a winding support 1 according to the invention is possible. The individual sheet-metal laminations are however of identical form in the region that forms the tooth head 16 and at least a part of the base element 20. Each sheet-metal lamination that is part of the tooth shank 14 is also part of the tooth head 16.

In particular, those sheet-metal laminations which form the face sides of the winding support 1 run in continuous fashion from the base element 20 via the tooth shank 14 to the tooth head 16.

It is advantageous for the contour of the sheet-metal laminations to be of mirror-symmetrical design with respect to the central sheet-metal lamination. A mirror-symmetrical design saves costs.

Proceeding from the axial face side of the winding support 1, the width 40 of the sheet-metal laminations in the region of the tooth shank 16 increases. Furthermore, the width 40 of the sheet-metal laminations increases in or counter to the radial direction 5.

In a refinement, the width 40d, 40e, 40f of the sheet-metal laminations in the vicinity of the tooth head 16 is greater than the width 40a, 40b, 40c of the sheet-metal laminations in the vicinity of the base element 20.

In a refinement of the invention, the sheet-metal laminations extend over the tooth shank 14 and the tooth head 16. In particular, in all sheet-metal laminations, the tooth heads 16 are connected via the tooth shank 14 to the base element 20.

Those sheet-metal laminations which form the face side of the winding support 1 in the region of the tooth shank 14 extend from the base element 20 via the tooth shank 14 to the tooth head 16.

In a refinement of the invention, the winding support 1 is divided into individual segments. Each segment has a pole tooth and a part which, when assembled together with further parts of other segments, forms the base element 20. The segments may likewise be assembled from a multiplicity of sheet-metal laminations. Such a construction permits simple production of the winding support 1. The segments are, in particular after having been enwound, joined together to form a winding support 1.

The increasing width of the tooth shank 14 in the radial direction 5 proceeding from the base element 20 yields an enlargement of the groove base 24. A larger groove base 24 yields an easier winding process, because more space is available for the needle. The needle can be guided through the groove 24 more easily.

In a refinement of the invention, at least one tooth shank 14 has a width which runs in concave or convex fashion in the radial direction 5. Viewed from the face side of the winding support, at least one tooth shank 14 has a concave or convex profile in the radial direction 5.

In a refinement of the invention, at least one tooth shank 14 has an increasing or decreasing width in the radial direction 5 of the winding support 1 over a part of the length of the tooth shank 14. The part of the length corresponds in particular to one half of the total length of the tooth shank or to at least one third of the total length of the tooth shank. The total length of the tooth shank 14 preferably extends from the base element 20 to the tooth head 16.

The invention claimed is:

1. A winding support (1) for an electric machine (100), having multiple pole teeth (10), wherein each pole tooth (10) has a tooth shank (14) around which at least one winding can be arranged, and wherein the tooth shank (14) has an increasing width of the tooth shank (14) in an axial direction (3) of the winding support (1) proceeding from an axial face side of the winding support (1), characterized in that the tooth shank (14) has an increasing or decreasing width in a radial direction (5) of the winding support (1).

2. The winding support (1) according to claim 1, characterized in that at least one tooth shank (14) has an increasing width axially toward a center of the tooth shank (14) proceeding from the axial face sides of the winding support (1).

3. The winding support (1) according to claim 1, characterized in that the winding support (1) has a base element (20), and in that the base element (20) has a circumferential region (22) on which the pole teeth (10) are arranged so as to project in or counter to the radial direction (5) of the winding support (1).

4. The winding support (1) according to claim 1, characterized in that the winding support (1) is assembled from individual elements which have in each case one pole tooth (10) and which, when assembled, form the winding support (1).

5. The winding support (1) according to claim 3, characterized in that the width of at least one tooth shank (14) increases or decreases in or counter to the radial direction (5) of the winding support (1) proceeding from the base element (20).

6. The winding support (1) according to claim 1, characterized in that the winding support (1) is embodied as a laminated core which is assembled from multiple sheet-metal laminations.

7. The winding support (1) according to claim 6, characterized in that individual sheet-metal laminations have, in the region of at least one tooth shank (14), an increasing or decreasing width in or counter to the radial direction (5) of the winding support (1).

8. The winding support (1) according to claim 6, characterized in that individual sheet-metal laminations of a tooth shank (14) have an increasing width proceeding from the axial face sides of the winding support (1).

9. The winding support (1) according to claim 6, characterized in that individual sheet-metal laminations of the laminated core are of similar form.

10. The winding support (1) according to claim 1, characterized in that the pole teeth (10) have pole heads (16) which have a greater width than the tooth shanks (14) at their widest point.

11. The winding support (1) according to claim 1, characterized in that the width of at least one tooth shank (14) increases or decreases in or counter to the radial direction (5) of the winding support (1) proceeding from a tooth head (16) arranged on said tooth shank.

12. A stator (120) having a winding support (1) according to claim 1.

13. A rotor (110) having a winding support (1) according to claim 1.

14. An electric machine (100) having a winding support (1) according to claim 1.

15. The winding support (1) according to claim 1, characterized in that the winding support (1) has a base element (20), and in that the base element (20) has a substantially circularly running circumferential region (22) on which the pole teeth (10) are arranged so as to project in or counter to the radial direction (5) of the winding support (1).

16. The winding support (1) according to claim 6, characterized in that individual sheet-metal laminations of the laminated core are of identical form.

\* \* \* \* \*